US009213821B2

(12) United States Patent
Saxena et al.

(10) Patent No.: US 9,213,821 B2
(45) Date of Patent: Dec. 15, 2015

(54) SYSTEM AND METHOD FOR MONITORING HUMAN INTERACTION

(75) Inventors: Vishal Krishna Saxena, Sikandra (IN); Ashutosh Saxena, Ahmedabad (IN)

(73) Assignee: Infosys Limited (IN)

( * ) Notice: Subject to any disclaimer, the term of this patent is extended or adjusted under 35 U.S.C. 154(b) by 563 days.

(21) Appl. No.: 12/711,688

(22) Filed: Feb. 24, 2010

(65) Prior Publication Data

US 2011/0209076 A1 Aug. 25, 2011

(51) Int. Cl.
*G06F 21/36* (2013.01)

(52) U.S. Cl.
CPC .................................... *G06F 21/36* (2013.01)

(58) Field of Classification Search
USPC ........................................................ 715/764
See application file for complete search history.

(56) References Cited

U.S. PATENT DOCUMENTS 7,139,740 B2 11/2006 Ayala
7,139,916 B2 11/2006 Billingsley et al.
7,149,801 B2 12/2006 Burrows et al.
2002/0120853 A1 8/2002 Tyree
2004/0059951 A1 3/2004 Pinkas et al.
2004/0199597 A1 10/2004 Libbey et al.
2005/0065802 A1 3/2005 Rui et al.
2005/0066201 A1 3/2005 Goodman et al.
2005/0144064 A1 6/2005 Calabria et al.
2005/0229251 A1 10/2005 Chellapilla et al.
2006/0026246 A1 2/2006 Fukuhara et al.
2006/0047766 A1 3/2006 Spadea
2006/0095578 A1 5/2006 Paya et al.
2006/0248344 A1 * 11/2006 Yang ............................ 713/183
2007/0005500 A1 1/2007 Steeves et al.
2007/0026372 A1 2/2007 Huelsbergen
2007/0043617 A1 2/2007 Stein et al.
2007/0043681 A1 2/2007 Morgan et al.
2009/0235327 A1 * 9/2009 Jakobsson et al. ................ 726/2
2011/0208716 A1 * 8/2011 Liu et al. ....................... 707/710

OTHER PUBLICATIONS

"/bj2bot: Bejeweled 2 Bot for Xbox 360 Achievements", Jun. 4, 2007, 13 pages, <http://www.brains-n-brawn.com/default.aspx?vDir=aicaptcha>.
"563.10.3 CAPTCHA", presented by Sari Louis, Spring 2006, 19 pages.
"[Web Security] Defeating CAPTCHAs via Averaging (fwd)", bugtraq at cgisecurity.net, Jan. 29, 2007, 2 pages, <http://www.cip.physik.uni-muenchen.de/~wwieser/misc/captchaf>.
"Breaking CAPTCHA without OCR", Nov. 30, 2005, <http://www.puremango.co.uk/cm_breaking_captcha_115.php>, 1 page.
"CAPTCHA asp.net Web Control (English)", G4n GURU4.net, Jul. 18, 2006, 5 pages, <http://www.guru4.net/english/article/captcha/default.aspx>.

(Continued)

*Primary Examiner* — Thanh Vu

(74) *Attorney, Agent, or Firm* — Lerner, David, Littenberg, Krumholz & Mentlik, LLP

(57) ABSTRACT

A method & system for human interactive proof (HIP) is provided. A user is provided to respond a query linked to a logical captcha object or an analytical captcha object. Upon receiving inputs from the user, the correct information of the said captcha & the user's input is compared. If the user's input and the correct information of the captcha object matches then the user is authenticated as human, else the user is authenticated as not a human.

17 Claims, 7 Drawing Sheets

| 2 | 9 | 3 |
|---|---|---|
| 4 | 1 | 6 |
| 7 | 5 | 8 |

Provide the sum of the numeric integers shown in first row

(56) References Cited

OTHER PUBLICATIONS

"CAPTCHA: Telling Humans and Computers Apart Automatically", The Official CAPTCHA site, Jan. 3, 2010, 4 pages, <http://www.captcha.net/>.
"CAPTCHAs in phpBB", phpBB • Blog • CAPTCHAs in phpBB, posted by Kellanved, Aug. 28, 2008, 9pages, <http://blog.phpbb.cc/articles/captcha/>.
"Defeating Captcha 430", posted by CmdrTaco on Wednesday Aug. 25, 2005, pp. 1-30, <http://it.slashdot.org/article.pl?sid=05/08/24/1629213&from=rss>.
Human Interactive Proofs: Second International Workshop, HIP 2005, paper by Baird and Bentley, 1 page, <http://books.google.com/books?vid=ISBN3540260013&id=XaUR43QR-PEC&pg=PA98&lpg=PA98&ots=4JNzemRY75&dq=paper+by+Baird+and+Bentley&sig=g0A6Yu8UBCS6bePMqlOhXGZ6xOw>.
"Implicit CAPTCHAs", Document Recognition and Retrieval XII, Jan. 16-20, 2005, San Jose, California, USA, Proceedings. SPIE 2005 SPIE Proceedings ISBN 0-8194-5649-7, pp. 191-196.
"Neural Park: Captcha this!", Nov. 1, 2006, 4 pages, <http://www.neuralpark.com/blog/2006/11/01/captcha-this/>.
"Petmail Documentation: Petmail Design", design.html, v 1.5, Jul. 21, 2005, pp. 1-19, <http://petmail.lothar.com/design.html>.
"Phishing Activity Trends Report", Anti-Phising Working Group, Jul. 2005, pp. 1-8, <http://docs.apwg.org/reports/APWG_Phishing_Activity_Report_Jul_05.pdf>.
"PWNTCHA—CAPTCHA Decoder", Caca Labs, Apr. 26, 2008, 5 pages, <http://sam.zoy.org/pwntcha/>.
"The State of Spam", A Monthly Report, Jan. 2007, Symantec Messaging and Web Security, <http://www.symantec.com/avcenter/reference/Symantec_Spam_Report_-_January_2007.pdf>.
A CAPTCHA Server Control for asp.net, Code Project, by wumpus1, Jan. 31, 2007, 6 pages, <http://www.codeproject.com/aspnet/CaptchaControl.asp>.
Atwood, Jeff, "Coding Horror" CAPTCHA Effectiveness, Oct. 25, 2006, pp. 1-29, <http://www.codinghorror.com/blog/archives/000712.html>.
BotDetect CAPTCHA Generator Homepage, captcha.com, May 1, 2013, 2 pages, <http://www.lanapsoft.com/products.html>.
CAPTCHA Image, by BrainJar, Code Project, Feb. 9, 2004, 6 pages, <http://www.codeproject.com/Articles/5947/CAPTCHA-Image>.
CAPTCHA: Definition from Answers.com, 2013, 10 pages,<http://www.answers.com/topic/captcha-1>.
Chellapilla et al., "Building Segmentation Based Human-Friendly Human Interaction Proofs (HIPs)", H.S. Baird and D.P. Lopresti (Eds.): HIP 2005, LNCS 3517, pp. 1-26, 2005.
Chellapilla et al., "Using Machine Learning to Break Visual Human Interaction Proofs (HIPs)", Advances in Neural Information Processing Systems 17 edited by L. Saul, Y. Weiss, and L. Bottou (2005), 8 pages.
Coates et al., "Pessimal Print: A Reverse Turing Test", Proceedings, Sixth International Conference on Document Analysis and Recognition, Sep. 10-13, 2001, pp. 1154-1158.
Dynamic image generation in custom controls, Blogs / Fritz Onion, 2005, 6 pages, <http://pluralsight.com/blogs/fritz/archive/2005/02/11/5789.aspx>.
Festa, "Spam-bot tests flunk the blind", CNET.news.com, published Jul. 2, 2003, 6 pages, <http://news.com.com/2100-1032-1022814.html>.
Fischer et al., "Visual CAPTCHAs for Documentation Authentication", Multimedia Signal Processing, 2006 IEEE 8th Workshop, 1 page.
G. Mori and J. Malik, "Breaking a Visual CAPTCHA", Sep. 2, 2004, 4 pages,<http://www.cs.sfu.ca/~mori/research/gimpy/>.
Greg Mori , Jitendra Malik, Recognizing objects in adversarial clutter: breaking a visual captcha, Proceedings of the 2003 IEEE computer society conference on Computer vision and pattern recognition, p. 134-141, Jun. 18-20, 2003.
Kandula et al., "Botz-4-Sale: Surviving Organized DDoS at Crowds", Proceedings of the 2nd Symposium on Networked Systems Design and Implementation, May 2-4, 2005, Boston, MA, USA, 20 Pages.
Kellner, Peter, "The ultimate CAPTCHA CustomServer Control", Aug. 20, 2006, 24 pages, <http://peterkellner.net/2006/08/20/the-ultimate-captcha-custom-server-control/>.
Liu C.-L., Fujisawa H., "Classification and Learning for Character Recognition: Comparison of Methods and Remaining Problems in Neural Networks and Learning in Document Analysis and Recognition", First IAPR TC3 NNLDAR Workshop, p. 1-7, Seoul, Korea, Aug. 29, 2005.
Lopresti, Daniel, "Leveraging the CAPTCHA Problem", Department of Computer Science and Engineering Lehigh University, Bethlehem, PA, presented at the Second International Workshop on Human Interactive Proofs, May 2005, pp. 1-15, <http://www.cse.lehigh.edu/~lopresti/Publications/2005/hip05.pdf>.
May, Matt, "Inaccessibility of CAPTCHA", Alternatives to Visual Turing Tests on the Web W3C Working Group Note Nov. 23, 2005, 10 pages, <http://www.w3.org/TR/2005/NOTE-turingtest-20051123/>.
Mlemos, "CAPTCHA harder to break using animations", via phpclasses.org, published Dec. 6, 2006, 1 page, <http://www.dzone.com/links/captcha_harder_to_break_using_animations.html>.
Paul Lockwood's technology focused blog, Hands on.Net Architect in Alpharetta, GA, Category Archives: Other, posted on Jul. 3, 2005 by dotnetworkaholic, 2 pages, <http://blogs.clearscreen.com/migs/archive/2004/11/10/575.aspx>.
R. Fox, W. Hartmann "An Abductive Approach to Handwritten Character Recognition for Multiple Domains" in the Proceedings of the 2006 International Conference on Artificial Intelligence vol. 2, p. 349-355.
Turing, "The Alan Turing Internet Scrapbook", The Turing Test, 1950, 7 pages, <http://www.turing.org.uk/scrapbook/test.html>.
von Ahn et al., "Telling Humans and Computers Apart Automatically", Communications of the ACM, Feb. 2004, Vil. 47, No. 2, pp. 1-58.

* cited by examiner

| 2 | 9 | 3 |
| --- | --- | --- |
| 4 | 1 | 6 |
| 7 | 5 | 8 |

Provide the sum of the numeric integers shown in first row

Match the flag type with respective country-map

| S. No. | Image Type | S. No. | Number of images |
|---|---|---|---|
| 1 | | A | 3 Squares |
| 2 | | B | 3 Triangles |
| 3 | | C | 3 Circles |

Match the image type with respective number of images 500
519
521
501
503
503
503
505
505
505
505
505
505
505
505
505
507
509
511
513
515
517

SYSTEM AND METHOD FOR MONITORING HUMAN INTERACTION

TECHNICAL FIELD

The present technique relates to authenticate human interactive proof (HIP) using a query based logical captcha object or analytical captcha object provided with interface. The captcha is displayed at user's interface at his system. The user is requested to respond the query. For correct response, the user is authenticated as human else the user is not authenticated as human.

BACKGROUND OF THE INVENTION

Various reports indicate increased reliance on the Internet as a predominant medium for communication. Indeed, the Internet has emerged as the most essential and cost effective medium for communication and interaction for corporations, institutions, and individuals. In that regard, security concerns have arisen with respect to Internet based transactions. Under many circumstances, a service provider expects a responder to be a human. That is, the service provider expects that a response received from the responder is generated by a human using a user machine rather than the response being machine-generated (e.g., a response by bots or software). Therefore, a desire of human interactive proof has evolved. For example, in an Internet-based voting survey offered by a service provider, for example, whether brand "A" is better than brand "B", the service provider may essentially expect a human as responder to the survey. However, various software programs have been developed that are configured to provide a favorable response for one of the brands. Those programs may be configured to provide a favorable response causing the voting result to become fabricated and the final result to not be a true result. To affirm there is a human response and to evade the software program or bots to provide any response, many techniques have been developed. One well-known technique that is extensively used in ensuring proof of human interaction is providing a captcha object to the user machine. Conventionally, captcha objects may be images, pictures, alphanumeric strings, or combinations thereof, which are intended to be displayed at user's interface. Conventionally, a query such as "what is the image", "write the name of the object displayed", "enter the displayed text" or another similar query may also be asked when the captcha object is presented to a user. Upon displaying the captcha object, the user may be requested to provide a suitable response for the captcha in an input box. A normal human user is likely to be able to recognize or read the challenge provided in the captcha, and provide an appropriate response. This process establishes whether the interactive user is a "human" or a not a human i.e., a "machine", bot, software, etc.

Because captchas displayed at a user's interface tend to be static, the above-described approach suffers from several disadvantages. Techniques like optical character recognition (OCR) have been successfully used to break the captchas mentioned above. An OCR system, for example, may recognize the image or text presented at a system's interface and feed a response as if a human. Similarly, software programs may also be devised that contain a list of plausible images and dictionary connotations corresponding to the images. Such software programs may fetch the image displayed at a client system interface and compare it with the images in the list. If the image is matching, the software programs may select the dictionary connotation corresponding to the image and provide it as a response. For example, if a lion is displayed at the interface of system, a software program may fetch the image and compare it to the list of stored images. On matching the image displayed in the interface with image of lion from the list, the dictionary connotation corresponding to the image from the list (i.e., lion) may be fed as user input. Thus, software applications or machines may be devised that are able to provide proper responses to captcha queries and defeat the object of human interactive proof.

As a result, an improved captcha is desired to establish human interactive proof where the captcha should be designed in such a way that it is neither easy for a software program to solve, nor too hard for a human to infer and provide a response to.

BRIEF SUMMARY OF THE INVENTION

The summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one embodiment of the technique, a method for authenticating a human interactive proof (HIP) is described. In one embodiment of the technique, a method to authenticate a human interactive proof is described. The method involves providing an interface embedded with a logical captcha object or an analytical captcha object to a user. A query associated with the captcha is also provided and displayed at user machine interface. The captcha object creation and the associated query creation is a dynamic process. The captcha, the associated query and the expected response for the query are stored on machine readable medium. The user is enabled to provide response for the query associated with the logical or the analytical captcha object. On receiving the response, the user's response is compared and validated with information stored for the captcha on machine readable medium. If the user's input is correct, the user is authenticated as a human; if the user's input is incorrect, the user is authenticated as not a human. In one example, a captcha object comprises "6 squares" and the associated query to the captcha object is "type the numbers of squares" or "provide image type and numbers of the images". The captcha object and the associated query are displayed at user machine interface. A normal human is adequately competent to recognize the "the numbers of squares" or able to recognize "image type and number of images" as requested in the query. The user's response and the information stored on computer readable medium are compared. On matching the response, the user is authenticated as human otherwise the user is determined as not a human.

In yet another embodiment of the present technique, a system for HIP is disclosed. The system includes a generating module to generate a logical captcha object or an analytical captcha object and a generating module to generate a query linked with query; a communicating module, for example internet, to communicate the generated captcha and the linked query at the user's interface and to receive response from the user thereof; and a authenticating module to compare the response of user with the forwarded motion random HIP.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
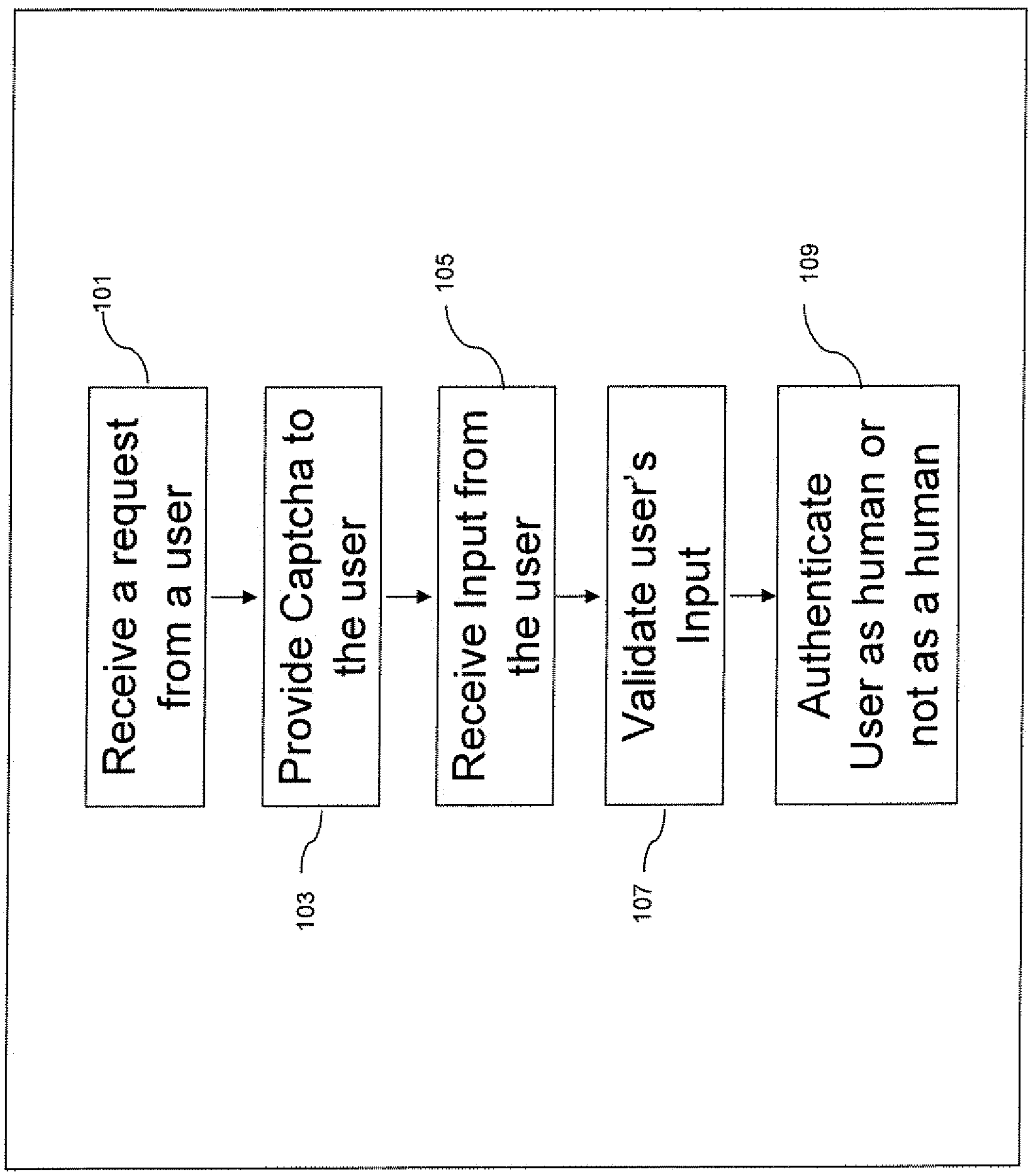
FIG. 1 is a flowchart illustrating a method of providing a captcha to client and receiving the input of the client according to one embodiment of the present technique.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the systems and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As will be appreciated by people skilled in the art, to best understand the present invention it is important to be familiar with the definition in which it is used:

"User" or "client" in the present technique represents to any person or entity desiring to use or access to some-kind of protected service or application (e.g., opening of web-based new account, access to available web-based account, online transaction etc.)

"Client machine" or "client's computer system" or "user's machine" or "user's computer system" or "client system" or "User system" in the present technique includes personal computers, desktop, server computers, hand-held device or laptop devices, multiprocessor systems, microprocessor-based systems, network PCs, mobile devices, personal digital assistants, smart phones, digital cameras, kiosks, ATM and the like.

"Interface" or "User interface" in the present technique represents interface of "client machine" or "client's computer system" or "user's machine" or "user's computer system" or "client system" or "User system".

"Server computing system" or "Server computing machine" represents a server machine or server system or server application or combinations thereof and other necessary hardware or software components, to facilitate secure access to the server.

"Generating module" in the present technique represents a stand alone unit or an integrated unit of server computing system.

"Communicating module" in the present technique represents a stand alone unit or as a part of server or combinations of both that is provided to connect user's client machine with server computing system through a network.

"Online Network" or "online" or "network" in the present technique represents internet, or a local area network, or a wireless network, or a wide area network, a point-to-point dial-up connection, and the like.

"Online services" or "internet based services" includes opening one or more new online accessible accounts (i.e., email account, online bank account), accessing existing online account, validating an input during an online poll, exercising online transaction, accessing online data access, responding to an online service, online response validation and the like. The online service is maintained at service provider end.

"Authenticating module" in the present technique represents a stand alone unit or a part of server computing system.

"Unit" or "module" represents a stand alone unit or combination of units enabled to execute desired actions.

Referring to the figures, FIG. 1 is a flowchart illustrating a method of providing a captcha to a client and receiving the input from the client according to one embodiment of the technique. The method starts with step 101, a client desiring to utilize an online service (e.g., opening a new online email account) using a client machine (e.g., a desktop) sends a request to a server computing machine of a service provider. The server computing machine and the client's machine are linked though a network, such as the Internet. A webpage is transmitted at client machine's interface using a network, as represented in step 103. The webpage is embedded with a logical captcha object or an analytical captcha object and a query linked to the embedded captcha object. The captcha object includes an image or group of images or numeric values or alphanumeric texts. As apparent to those skilled in the art, distortion of the captcha contents i.e., images or the numeric values or the alphanumeric text is not out of the scope of the present technique.

Further, color of contents of the captcha object may be diverse e.g., in a numeric values based captcha object, one or more selected numerals may be presented in red color while other colors recognizable a human. For example, for a numeric captcha object "89763", the numerals "8", "9", "7" "6", and "3" are displayed in red color, blue color, green color, pink color, and brown color respectively. The associated query for the captcha object may be "what is product for numerals in red color and pink color" or "type the sum of numerals shown in blue color, green color, and red color" and so on. The information about the captcha and the linked query and the projected response is stored at server computing machine end. Therefore, only a human intelligence can decipher the captcha object.

According to one another embodiment, the query linked to the captcha may be forwarded separately in another dialogue box along with webpage embedded with the captcha object. The captcha object and the dialog box with a linked query are presented at client's machine.

The client is requested to solve the query and submit his response through an input receiving box displayed at webpage. The response from the client's machine is received as represented in step 105, and saved for validation. In next step 107, the client response for the captcha is compared with stored information of the captcha. If the response received from client's machine matches with information stored of the said captcha object, the client using the client machine is authenticated as a human, else the client is not a human i.e., some software program or bots.

FIG. 2 is a depicting an exemplary example of a logical captcha object or an analytical captcha object according to one embodiment. The captcha objects are termed as logical captcha object or an analytical captcha object since a human with a normal intelligence can only solve present challenge displayed in captcha. For example in FIG. 2*a*, some numeric integers are displayed in a matrix. The matrix contains a few columns and a few rows. Each cell of the matrix may or may not contain any numeric integers. Also, all cells of the matrix may have similar background color or may have varied different colors. Also, the numeric integers may be presented in same color or in different colors.

As mentioned, the associated query is presented at a user machine interface. The associated query, as shown in FIG. 2*a*, is based on simple mathematical logic or analytical reasoning that is simple to perform for any human with normal intelligence. For example, a query on summing the numeric integers or multiplying of numeric integers or subtraction of numeric integers or dividing of numeric integers or combinations may require the application of mathematical logic. Therefore, the query for the captcha object can be "provide the sum of the numeric integers presented in first row", "provide the sum of the numeric integers presented in first column", "provide the sum of the numeric integers presented in red color (or any other color presented in the captcha object)", "provide the product of numeric integers of presented in red color and green color", or another similar query. For example, if the captcha object FIG. 2*a* is presented to the client machine with an associated query of "provide the summation of the numeric integers presented in first row", the expected input from user's machine will be "13". It will be clear to those skilled in the art that other mathematical logic based queries can also be generated and those queries are also within the scope of present technique. Furthermore, it will be clear to those skilled in the art that the background color of the cells or the method or representing of numeric integers may vary.

An instruction for providing the input for the said captcha and submitting the response is presented. On receiving the inputs from the client's machine, it is compared with stored information of the said captcha. If the response received from the client's machine and the stored information associated to the captcha matches, the client machine user is authenticated as human otherwise the client machine user is authenticated as not a human i.e., bots or software or machines.

Figures 2C, 2D:
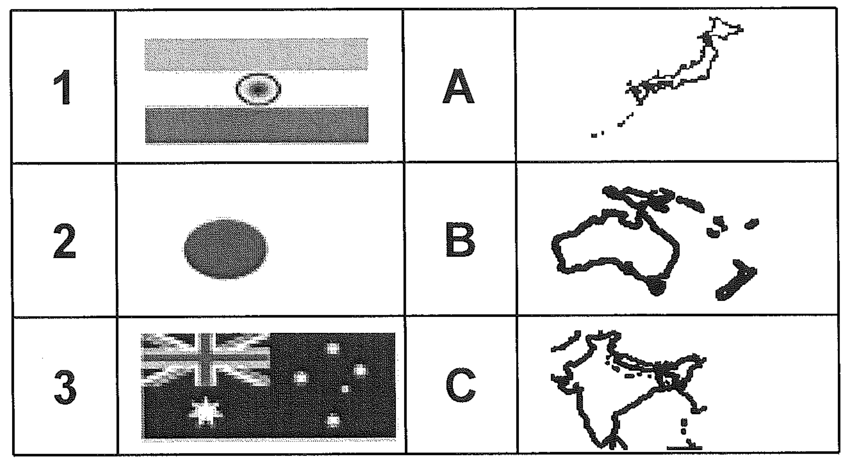
FIG. 2 is a depicting an exemplary example of a logical captcha object or an analytical captcha object according to one embodiment of the present technique.

A few more examples of captcha object such as FIG. 2*b* or FIG. 2*c* or FIG. 2*d* are displayed wherein solving of these captcha objects involve human intelligence. In FIG. 2*b*, for example, six embedded squares are displayed. As will be apparent to those skilled in the art, various modifications are possible for example diverse size of squares (some square are smaller and few others are larger, apparent enough to distinguish among them) or different or same colors of the squares or different or same background colors of the squares etc. A user can be requested to "provide number of squares displayed in the captcha object" or "provide total number of squares in red colors (if one or more squares are displayed in red color)" or "provide total number of squares in having red background colors (if background color of one or more squares are displayed in red color)". Also, as will be apparent to those skilled in the art, there can be one or more circles or one or more triangles or any other one or more images or combinations wherein these images be easily recognized by human intelligence. Various other modifications such as one or more circles or one or more triangles or any other one or more images or combinations, and/or diverse or similar colors of images and/or diverse or similar background colors of images are possible and within the scope of the present technique. With every instance, a new captcha is generated and presented to the client machine. A query linked with the captcha object is also generated and presented to the client machine.

Similarly, in FIG. 2*c*, territory maps of few select countries and the national flags of those countries are displayed. A human with normal intelligence can recognize the countries and the national flag of the countries. The client is provided a request to match the national flag and the country it is associated with. For FIG. 2*c*, the correct result is "1C2B3A". If the response received from the user matches with the correct result, the user is authenticated as human, else the user may be regarded as non-human (i.e., a bot, a software program, or a machine program). In FIG. 2*d*, various types of shapes and number of shapes are displayed. A user is requested to match the type of shape with the number of shape. For FIG. 2*d*, the correct result is "1C2A3B". If the response received from the user matches with the correct result, the user is authenticated as human, else the user may be regarded as non-human (i.e., a bot, a software program, or a machine program). As will be apparent to those skilled in the art, various modifications such as diverse colors of shape, background color, insertion of different number of shapes are possible and within scope of the present technique.

Figure 3:
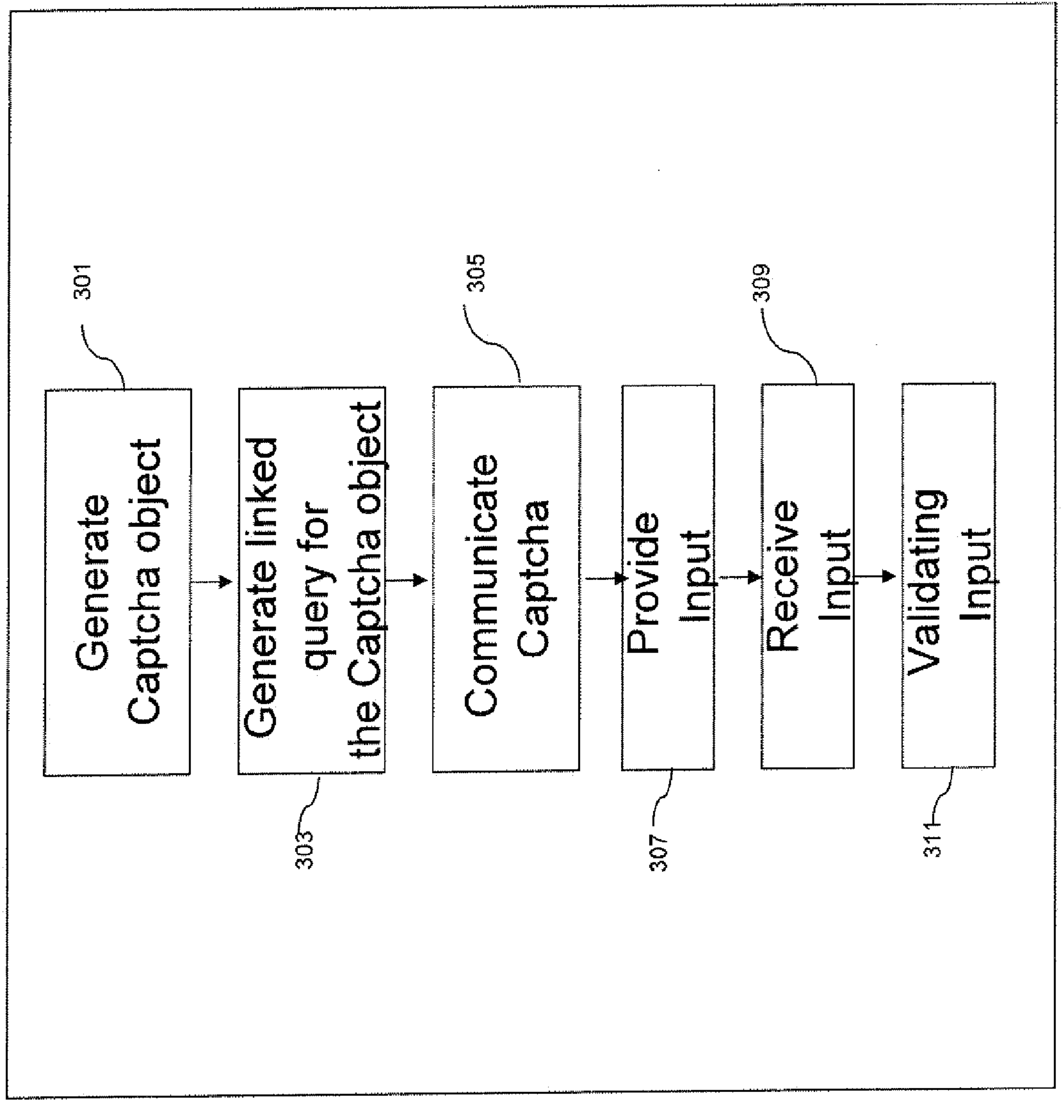
FIG. 3 is a flow diagram illustrating a method of generating a logical captcha object or analytical captcha object according to one embodiment of the present technique.

Moving to next diagram, FIG. 3 is representing a flow diagram illustrating a method of generating a logical captcha object or analytical captcha object according to one embodiment of the technique. At many instances, for example in online voting or in creating new online account or during online transactions or during responding to emails or at many other similar instances, human interactive proof (HIP) is essentially required. The present technique provides a method of HIP using a logical captcha object or analytical captcha (samples of captcha shown in FIG. 2). The captcha object presented to the client is a part of web-page, however, the captcha object can also be provided in a separate dialogue box.

To solve the knowledge based and mathematical skill captcha object, for example as shown in FIG. 2, a user has to recognize the item displayed and thereafter he has to use his intelligence to solve the query associated with the captcha object. In step 301, he captcha object is generated using a captcha object generation module. The captcha object is generated dynamically, more preferably on the fly according to one embodiment of the present technique. As represented in step 303, a query related to the said generated captcha object is created using a query generating module. For example if FIG. 2*a* is generated as a logical captcha object or analytical captcha object, then an associated query presented to the user is "provide the sum of the numeric integers shown in first row".

As shown in step 305, the captcha object and the associated query are provided to the client machine through a network. On receiving the captcha and the associated query, a user is requested to provide his response (block 307) in an input box presented along with the web-page. On submitting the response for the query, the response is received and captured as depicted in step 309. Subsequently, the response is validated by matching with correct result of the said captcha as represented in step 311. If the response received from the user machine matches with the stored correct result for the said captcha object, the user is authenticated as human, else the user is authenticated as not a human.

Figure 4:
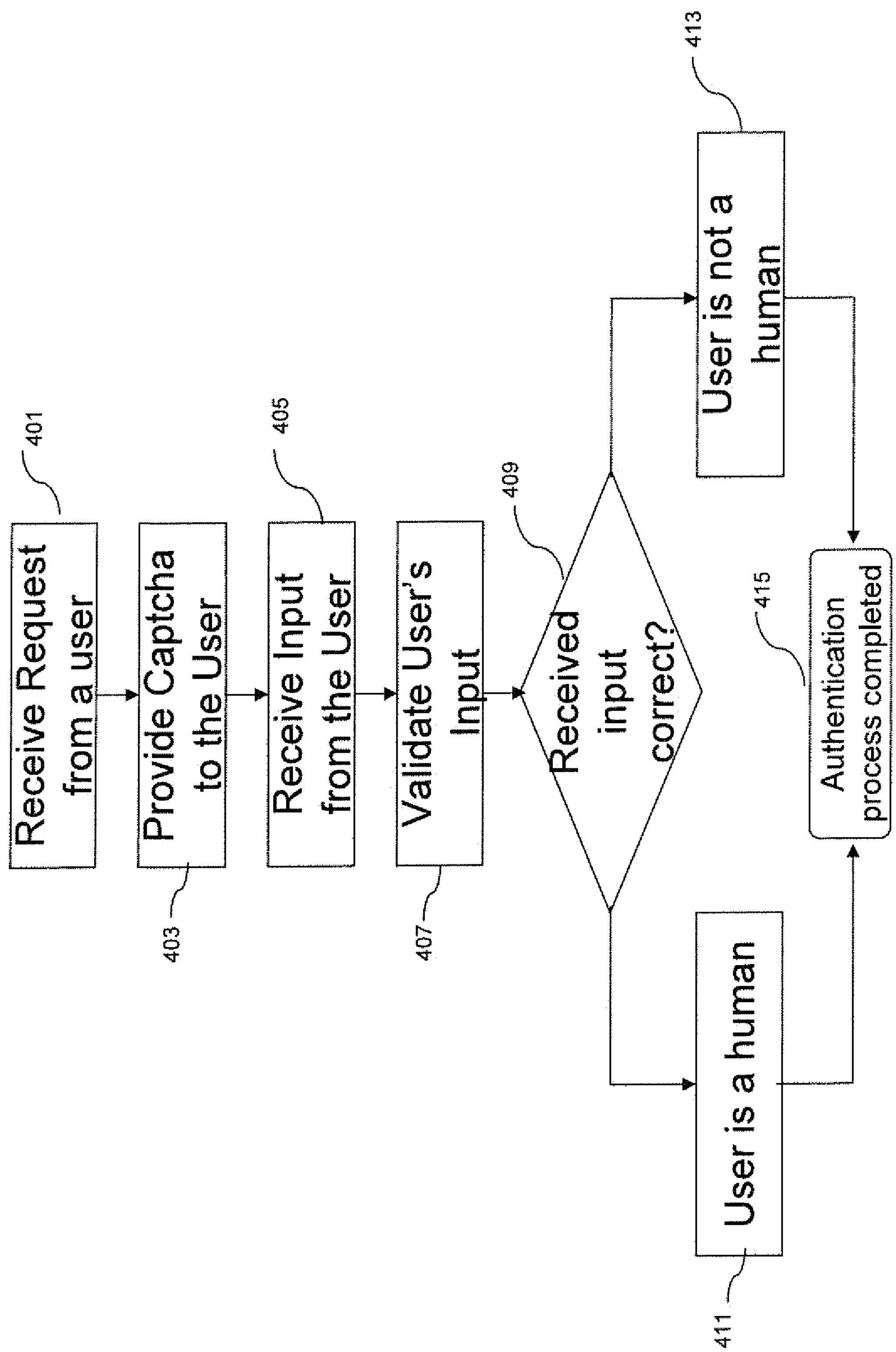
FIG. 4 is a flow diagram representing a method of human interactive proof according to one embodiment of the present technique.

Referring to FIG. 4 is a flow diagram representing a method of human interactive proof according to one embodiment of the present technique. As an example of human interactive proof, the method starts with a user request to exploit an online service as represented in step 401. A user desiring to exercise an online service submits a request to the server using a client machine. The client machine and the server are interacting using a network. The server can be coupled with other processing modules and databases. On receiving a request for an online service to a server, a client machine is provided a web-page along with a logical captcha object or an analytical captcha object and a linked query (block 403) wherein the logical captcha object or the analytical captcha object and the associated query type is described in any of the earlier sections.

Subsequently, a web-page along with a captcha image and a linked query is displayed at client machine interface. The web-page also contains space (i.e., input box) for entering input by the user. On submitting the response by a user using client machine, the input is captured at server as represented in step 405. The user response for the captcha object is compared with stored information for the said captcha object in order to validate the user's response as indicated in step 407. If the user response is correct (block 409), the user is authenticated as human (block 411) and the human interactive proof authentication process is completed (block 415). If the user response is not correct (block 413), the user is authenticated as not a human (block 413) and the human interactive proof authentication process is completed (block 415).

Figure 5:
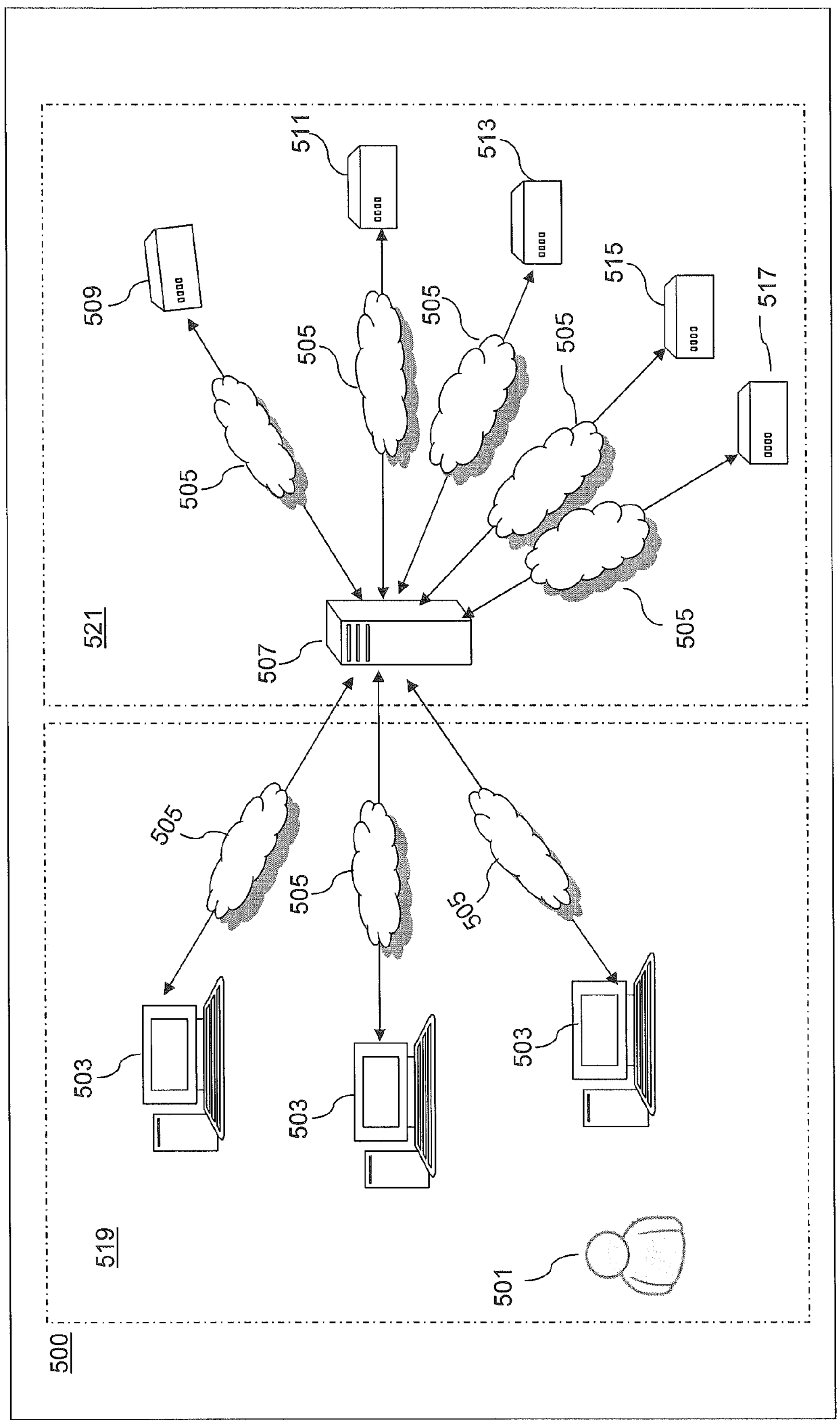
FIG. 5 is a schematic diagram representing a system of human interactive proof according to one embodiment of the present technique.

FIG. 5 is a schematic diagram of a system illustrating human interactive proof according to one embodiment of the present technique. As shown in the FIG. 5, section 519 indicates user's interaction parts and section 521 represents authentication processing parts of the system 500. The system includes a client machine 503 (e.g., a general purpose computer machine) meant to used by a user, a network 505 for example internet meant to interact client machine and various other units with server system 507, and various other processing modules such as unit 509 or unit 511 or unit 513 or unit 515 or unit 517 or other additional requisite units wherein these exemplary units may be enabled to process as authenticating module or captcha generating module or query generating module or storing module or validating module or; also these unit may be a integral part of the server system or can be separate and stand alone units. Amongst various processing units, some or all units may come as integrated units or available as an independent unit each.

According to one embodiment of the present technique, a user 501 aspiring to exercise an online service initiates the process using a client machine 503. The client machine 503 initiation is communicated through a network 505 to a server 507. On receiving a request for an online service by the server machine 507, the server machine 507 transmits the request to one of the suitable units 509 to generate a web-page. The system 500 further includes another unit 511 to generate a logical captcha object or analytical captcha object which is provided as a part of web-page. Further, the system 500 comprises unit 513 that is used to generate a query associated with the generated captcha object. Unit 515 is further provided to capture the user's input and to store information for the captcha object, the linked query, the correct information, and the user input. The unit 515 is configured to store the information about the captcha object provided to client machine interface, the associated query about the captcha object and correct response for the query of the said captcha object. The unit 515 is also configured to capture the inputs provided by the user. The information is applied in authenticating process for the user as a human or not a human. The unit 517 is configured to compare correct response for the query of the said captcha object and the input captured from the client machine interface. If the input received from the user machine and the stored correct response for the query of the said captcha object matches then the user of the client machine is authenticated as a human, if the input received from the user machine and the stored correct response for the query of the said captcha object doesn't match then the user of the client machine is authenticated as not a human.

Exemplary Computing Environment

Figure 6:
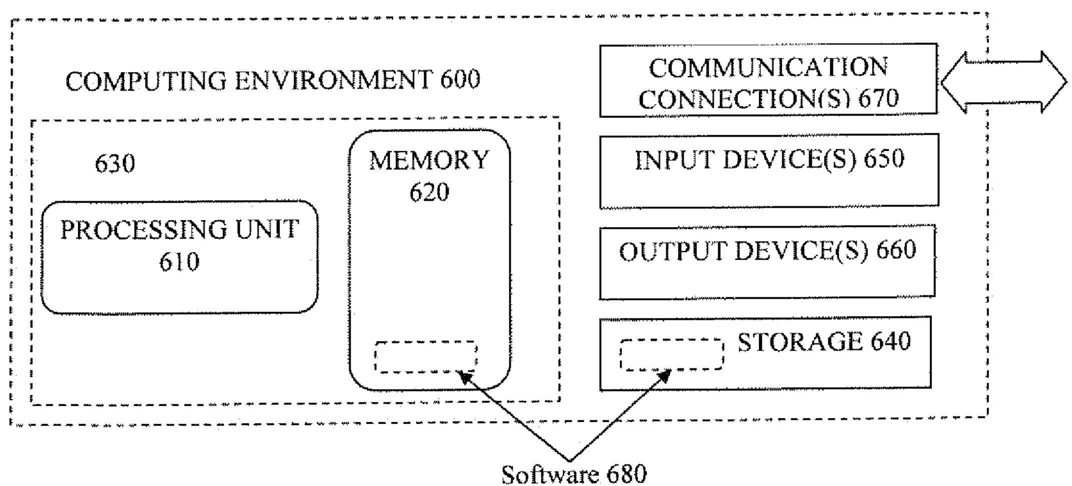
FIG. 6 is a system illustrating a generalized computer network arrangement, according to one embodiment of the present technique.

One or more of the above-described techniques can be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 710 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. In some embodiments, the storage 640 stores instructions for the software 680.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer implemented method for authenticating a Human Interactive Proof (HIP), comprising the steps of:

providing at least one interface embedded with at least one logical captcha object for enabling at least one user to request a service, wherein the at least one logical captcha object comprises a plurality of numeric values presented in a matrix with a plurality of rows and columns, further wherein the plurality of the numeric values are presented in a plurality of colors recognizable to the at least one user;

providing a query associated with the at least one logical captcha object, wherein the query is based on the plurality of numeric values in the plurality of rows and columns of the matrix and the plurality of colors associated with the numeric values;

receiving a response to the query from the at least one user, wherein the response is indicative of the at least one logical captcha object and is generated by performing, using a computer, a mathematical operation on the plurality of numeric values based on the plurality of colors associated with the numeric values, further wherein the mathematical operation comprises one of: addition, subtraction, multiplication, and division;

comparing the response received from the at least one user with stored information pertaining to the at least one logical captcha object; and authenticating the at least one user as human based on the correct results obtained in said comparison process or not authenticating the user as human based on the incorrect results obtained in said comparison process.

2. The method as recited in claim 1, wherein the at least one logical captcha object is implemented as a service offered on internet or intranet or both.

3. The method as recited in claim 2, wherein the service is a web-based service offered on the Internet or intranet or both.

4. The method as recited in claim 1, wherein the at least one logical captcha object is implemented in a form of an executable software application.

5. The computer implemented method of claim 1, wherein the at least one logical captcha object further comprises a plurality of countries' maps and a plurality of national flags, further wherein the at least one logical captcha object is associated with a query requesting the at least one user to match a national flag from the plurality of national flags to a corresponding country's map from the plurality of countries' maps.

6. The computer implemented method of claim 1, wherein the at least one logical captcha object further comprises a plurality of geometric figures presented in a plurality of colors and in a plurality of sizes, further wherein the at least one logical captcha object is associated with a query requesting the at least one user to count number of the geometric figures based on corresponding color and corresponding size.

7. The computer implemented method of claim 1, wherein the at least one logical captcha object further comprises a plurality of different geometric figures and a plurality of counts associated with the different geometric figures, further wherein the at least one logical captcha object is associated with a query requesting the at least one user to match a predefined geometric figure with a corresponding count.

8. A computer implemented method for generating a Human Interactive Proof (HIP), comprising the steps of:

receiving a request for at least one service from at least one user; and generating at least one logical captcha object using at least one generating module, wherein the at least one logical captcha object is embedded with an interface and comprises a plurality of numeric values presented in a matrix with plurality of rows and columns, further wherein the plurality of the numeric values are presented in a plurality of colors recognizable to the at least one user, further wherein the at least one logical captcha object comprises an associated query based on the plurality of numeric values in the plurality of rows and columns of the matrix and the plurality of colors associated with the numeric values, further wherein a response to the associated query is indicative of the at least one logical captcha object and is generated by performing, using a computer, a mathematical operation on the plurality of numeric values based on the plurality of colors associated with the numeric values, the mathematical operation comprises one of: addition, subtraction, multiplication, and division.

9. The method as recited in claim 8, wherein the at least one logical captcha object is implemented as a service offered on the Internet or intranet or both.

10. The method as recited in claim 9, wherein the service is a web-based service offered on the Internet or intranet or both.

11. The method as recited in claim 8, wherein the at least one logical captcha object is implemented in a form of an executable software application.

12. A system for authenticating a Human Interactive Proof (HIP), the system comprising:

at least one generating module adapted to generate at least one logical captcha object upon receiving a request for at least one service from at least one user, wherein a logical captcha is embedded in an interface and storing information pertaining to the at least one logical captcha object thereof, further wherein the at least one logical captcha object comprises a plurality of numeric values presented in a matrix with a plurality of rows and columns, further wherein the plurality of the numeric values are presented in a plurality of colors recognizable to the at least one user, further wherein the at least one generating module is further adapted to generate a query associated with the at least one logical captcha object, further wherein the query is based on the plurality of numeric values in the plurality of rows and columns of the matrix and the plurality of colors associated with the numeric values, the at least one generating module further adapted to transmit the query to the at least one user;

at least one communicating module adapted to transmit the at least one logical captcha object embedded in an interface to at least one user;

at least one receiving module adapted to receive a response from the at least one user, wherein the response is indicative of the at least one logical captcha object and is generated by performing, using a computer, a mathematical operation on the plurality of numeric values based on the plurality of colors associated with the numeric values, further wherein the mathematical operation comprises one of: addition, subtraction, multiplication, and division;

at least one comparing module adapted to compare the received response from the at least one user with the stored information pertaining to the at least one logical captcha object embedded with an interface; and at least one authenticating module adapted to authenticate the at least one user as human based on the correct results obtained in said comparison process or not authenticating the user as human based on the incorrect results obtained in said comparison process.

13. The system as recited in claim 12, wherein the at least one logical captcha object is implemented as a service offered on the Internet or intranet or both.

14. The system as recited in claim 13, wherein the service is a web-based service offered on the Internet or intranet or both.

15. The system as recited in claim 12, wherein the at least one logical captcha object is implemented in a form of an executable software application.

16. A computer program product comprising a non-transitory computer usable medium having a computer readable program code embodied therein for authenticating a Human Interactive Proof (HIP), comprising:

a program code adapted for providing at least one interface embedded with at least one logical captcha object for enabling at least one user to request a service, wherein the at least one logical captcha object comprises a plurality of numeric values presented in a matrix with a plurality of rows and columns, further wherein the plurality of the numeric values are presented in a plurality of colors recognizable to the at least one user;

a program code adapted for providing a query associated with the at least one logical captcha object, wherein the query is based on the plurality of numeric values in the plurality of rows and columns of the matrix and the plurality of colors associated with the numeric values;

a program code adapted for receiving a response to the query from the at least one user, wherein the response is indicative of the at least one logical captcha object and is generated by performing, using a computer, a mathematical operation on the plurality of numeric values based on the plurality of colors associated with the numeric values, further wherein the mathematical operation comprises one of: addition, subtraction, multiplication, and division;

a program code adapted for comparing the response received from the at least one user with stored information pertaining to the at least one logical captcha object; and a program code adapted for authenticating the at least one user as human based on the correct results obtained in said comparison process or not authenticating the user as human based on the incorrect results obtained in said comparison process.

17. A computer program product comprising a non-transitory computer usable medium having a computer readable program code embodied therein for generating an Human Interactive Proof (HIP), comprising:

a program code adapted for receiving a request for at least one service from at least one user; and a program code adapted for generating at least one logical captcha object using at least one generating module wherein the at least one logical captcha object is be embedded with an interface and comprises a plurality of numeric values presented in a matrix with a plurality of rows and columns, further wherein the plurality of the numeric values are presented in a plurality of colors recognizable to the at least one user, further wherein the at least one logical captcha object comprises an associated query based on the plurality of numeric values in the plurality of rows and columns of the matrix and the plurality of colors associated with the numeric values, further wherein a response to the associated query is indicative of the at least one logical captcha object and is generated by performing, using a computer, a mathematical operation on the plurality of numeric values based on the plurality of colors associated with the numeric values, the mathematical operation comprises one of: addition, subtraction, multiplication, and division.

* * * * *